UNITED STATES PATENT OFFICE.

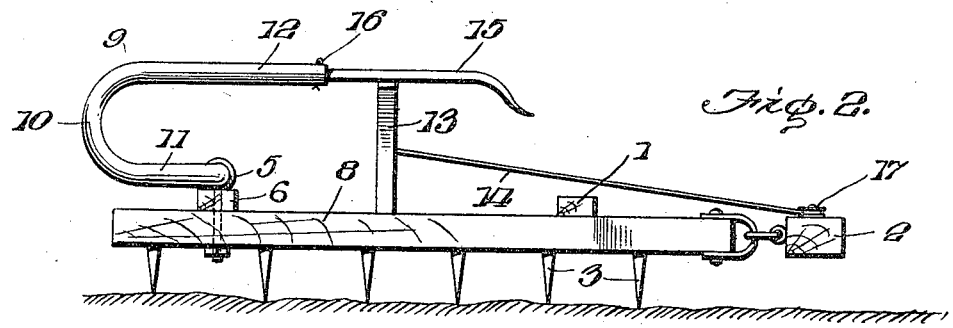
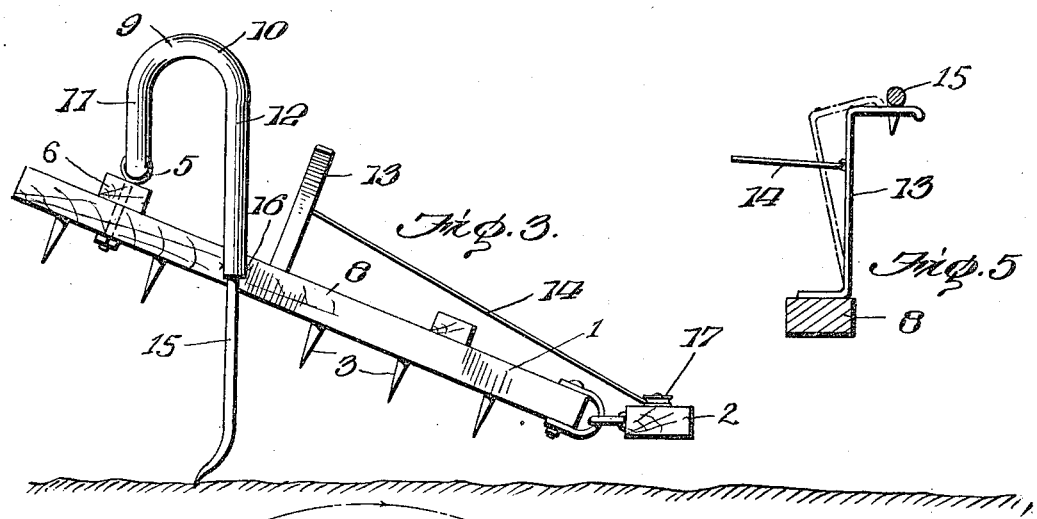
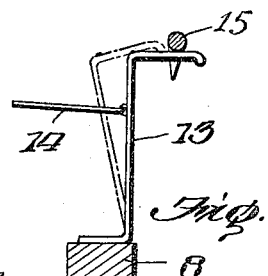
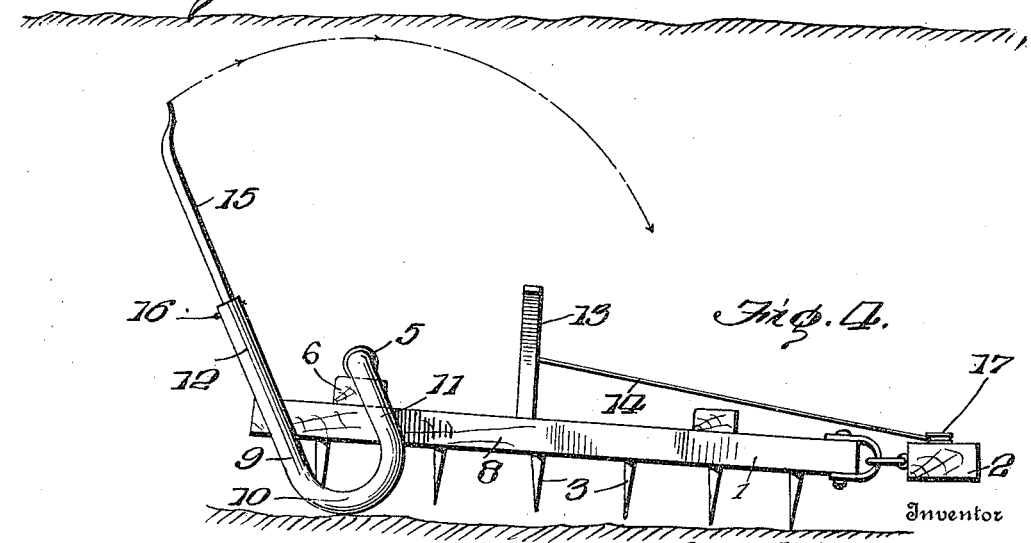

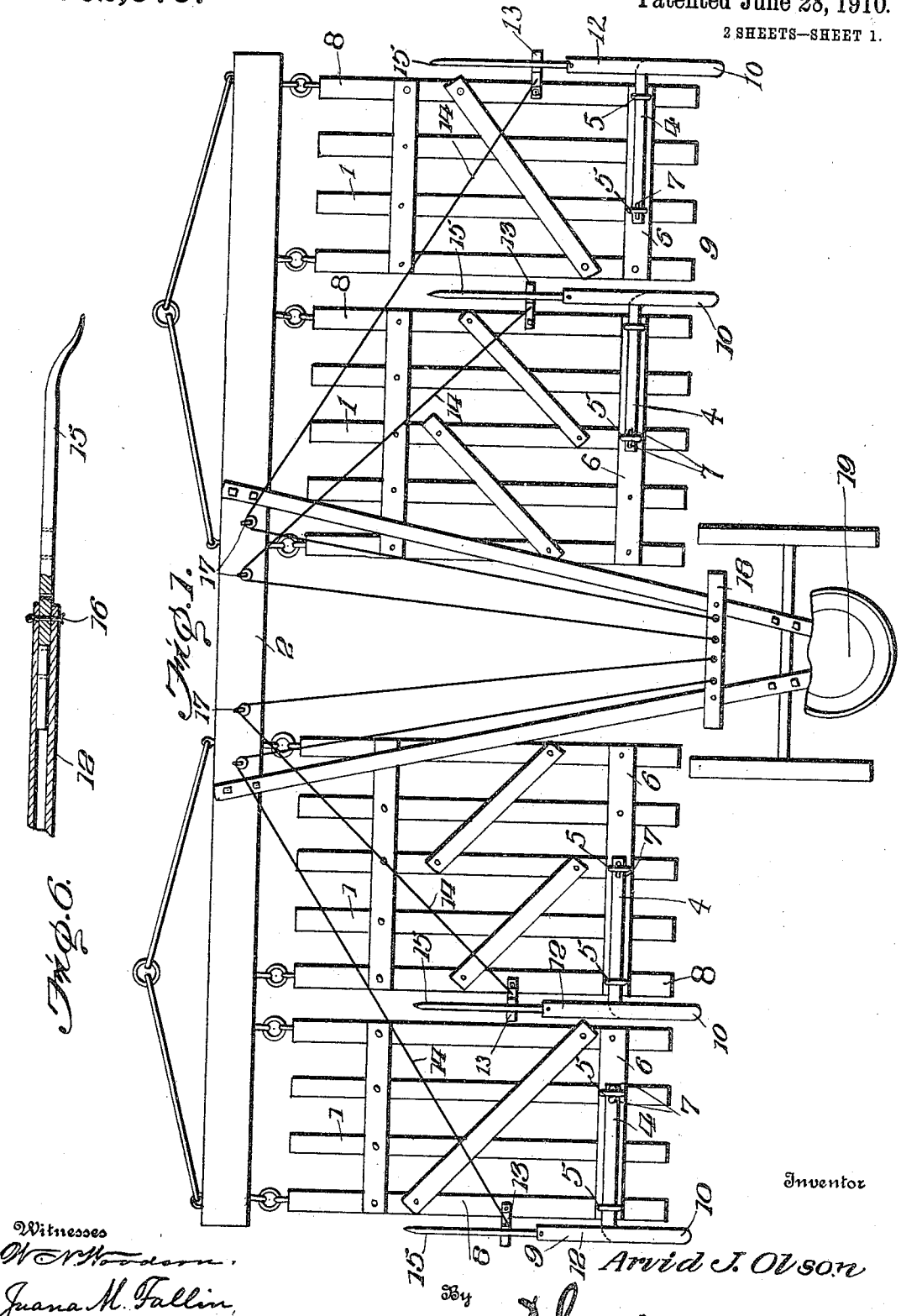

ARVID J. OLSON, OF KLOTEN, NORTH DAKOTA.

CLEANING ATTACHMENT FOR HARROWS.

962,579.  Specification of Letters Patent. Patented June 28, 1910.

Application filed July 13, 1909. Serial No. 507,407.

*To all whom it may concern:*

Be it known that I, ARVID J. OLSON, citizen of the United States, residing at Kloten, in the county of Nelson and State of North Dakota, have invented certain new and useful Improvements in Cleaning Attachments for Harrows, of which the following is a specification.

This invention comprehends certain new and useful improvements in harrows, and the invention has for its object an improved cleaning attachment which is susceptible of being readily applied to the harrow and which embodies novel lifting means whereby the harrow may be conveniently elevated so as to free the teeth from accumulated rubbish, the lifting means being arranged after operation, to be automatically returned to a normal position to restore the harrow upon the ground.

A further object of the invention is an improved device of this character that is applied to each of the sections of the harrow in such a manner as to render the same under immediate control of the driver and admit of one section being lifted independently of the others.

With these and other objects in view that will more fully appear as the description proceeds, the invention consists in certain constructions and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawings, in which:

Figure 1 is a top plan view of a harrow equipped with my improved cleaning attachments; Fig. 2 is a side elevation illustrating the normal position of the lifting arm; Figs. 3 and 4 are similar views showing different positions of the arm during its operation; Fig. 5 is a detail view of the spring bracket; and, Fig. 6 is a similar view illustrating the manner of connecting the telescopic section to the arm.

Corresponding and like parts are referred to in the following description and indicated in all the views of the drawings by the same reference characters.

The invention is illustrated in connection with a multiple harrow composed of a plurality of frames or sections 1 that are arranged side by side and independent of each other and are hingedly connected at their front ends to a transverse draft bar 2. These sections may be of any desired or approved construction or design, and are shown as provided with teeth 3 of conventional form. Each of these sections is equipped with one of my improved cleaning attachments or harrow jacks, and as all of the said attachments are substantial duplicates and are similarly mounted, only one of the same will be described.

The cleaning attachment embodies a shaft 4 that is journaled transversely at the rear of the harrow section, and in the present instance is mounted in eye bolts 5 secured in the rear cross bar 6. Pins 7 are fixed in the shaft on opposite sides of one of the eye bolts to maintain the shaft against longitudinal movement therein. At one end the shaft projects beyond the corresponding side bar 8 of the harrow frame and is angularly disposed to constitute an integral lifting arm 9 adapted for rotation in a vertical plane. The lifting arm is doubled upon itself at an intermediate point so as to be substantially U-shaped and to consist of a curved bend or elbow 10 and spaced members 11 and 12 connected by said bend, the member 11 being integral with the shaft and being shorter than the member 12, as shown.

In the normal position of the arm, the members 11 and 12 are disposed horizontally with the latter member arranged above the former and extending toward the front of the harrow, as illustrated in Fig. 2. The arm is retained in this position through the medium of a trip device that embodies a spring bracket 13 secured to and upstanding from the side bar 8 with its extremity turned laterally to form a rest for the free end of the arm. A trip cord 14 is secured to the spring bracket and is designed to be pulled, so as to spring the same laterally and release the lifting arm, when it is desired to clean the harrow section. The arm then swings downwardly and the free extremity thereof takes hold in the ground, the forward movement of the harrow causing the arm to swing rearwardly to assume the vertical position shown in Fig. 3, whereby the harrow section is elevated above the ground, so as to free the teeth 3 from accumulated trash. Upon the continued forward movement of the harrow, the arm swings rearwardly until the member 12 thereof rests upon the ground, the arm then swinging upwardly from its momentum, so that the elbow 10 is brought into contact with the ground (see Fig. 4). As the elbow rides over the ground it effects the continued swinging movement of the lifting arm, so that the same is automatically returned to its normal position, while the harrow section is replaced upon the ground after having passed over the accumulated trash. The trip cord 14 is relieved of tension after the initial movement of the arm, and the bracket 13 springs back to operative position to support the lifting arm, as before described.

The member 12 of the lifting arm preferably has a telescopic section 15 fitted thereto and held in extended position by any suitable means such as a cotter pin 16. By virtue of this arrangement the length of the said member may be varied to regulate the height to which the harrow section is lifted.

The trip cords 14 of the various cleaning attachments are passed forwardly about pulleys 17 secured to the draft bar 2 and are drawn rearwardly therefrom and attached to a cross bar 18 which is arranged below and just in front of the driver's seat 19 and serves as a foot rest. It will thus be apparent that the respective sections of the harrow are under the immediate control of the driver who can conveniently operate any one of the sections independently of the other sections, by merely treading upon the proper trip cord.

Having thus described the invention what is claimed as new is:

1. In a harrow, the combination of a frame, and a cleaning attachment of the character described embodying a lifting arm pivotally connected at one end to the frame to rotate in a substantially vertical plane, the arm being formed in proximity to said end with an elbow for the purpose specified, and a trip device for controlling the arm.

2. In a harrow, the combination of a frame, and a cleaning attachment embodying a lifting arm doubled upon itself intermediate of its ends to form a U-shaped elbow having members of different lengths, the shorter member being pivotally connected to the frame.

3. In a harrow, the combination of a frame, and a cleaning attachment comprising a shaft journaled transversely of the frame, and a lifting arm integral with one end of the shaft and adapted to rotate in a substantially vertical plane, the arm being doubled upon itself intermediate of its ends to constitute a U-shaped elbow, as and for the purpose specified.

4. In a harrow, the combination of a frame, and a cleaning attachment embodying a lifting arm pivoted to the frame to rotate in a substantially vertical plane, the arm being longitudinally extensible to regulate the height to which the frame is elevated.

5. In a harrow, the combination of a frame, and a cleaning attachment embodying a lifting arm doubled upon itself intermediate of its ends to form a U-shaped elbow having one member pivotally connected to the frame, the other member of the elbow being longer than the first named member and being longitudinally extensible.

6. In a harrow, the combination of a frame, and a cleaning attachment embodying a lifting arm pivotally connected to the frame to rotate in a substantially vertical plane, and a section telescoping with the swinging end of the arm and adapted to be secured in different longitudinally adjusted positions thereto.

7. In a harrow, the combination of a frame, and a cleaning attachment embodying a lifting arm pivotally connected at one end to the frame to rotate in a substantially vertical plane, the arm being doubled upon itself intermediate of its ends to constitute a U-shaped elbow, a spring bracket secured to and upstanding from the frame and serving as a rest for the free end of the arm, and a trip cord secured to the bracket for releasing the arm.

8. The combination of a harrow embodying a frame, a draft bar arranged in front of the frame and connected thereto, a lifting arm pivotally connected to the rear portion of the frame to rotate in a substantially vertical plane, a pulley secured to the draft bar, and a trip device adapted to control the lifting arm and embodying a trip cord passed forwardly around the pulley.

9. The combination of a harrow embodying a plurality of frames arranged side by side and independent of each other, a driver's seat, means carried by each of the frames for elevating the same above the ground, and trip devices secured to the respective frames for controlling the elevating means, said trip devices embodying trip cords running from the various frames and secured in close proximity to the driver's seat, as and for the purpose specified.

10. The combination with a harrow, of a lifting arm pivotally connected thereto to rotate in a substantially vertical longitudinal plane, means for normally supporting the arm in an inoperative position with its free end extending forwardly in front of the point of pivotal connection and above the ground, and means for releasing said supporting means to permit the free end of the arm to swing downwardly to take hold in the ground, the arm being formed with a curved bend adapted to engage with the ground to return the arm to its inoperative position.

11. The combination with a harrow, of a lifting arm consisting of spaced members, and a returned bend connecting the same, one of the members being pivotally connected to the harrow.

12. A harrow jack including a rotatable shaft, a lifting arm extended angularly from one end of the shaft and formed intermediate of its ends with a curved bend lying in a plane arranged angularly with respect to the shaft.

13. A harrow jack including a pivotally mounted lifting arm having a substantially U-shaped contour and consisting of spaced members, and a curved bend connecting the same.

14. A harrow jack including a pivotally mounted lifting arm extensible longitudinally to regulate the height to which the harrow is elevated.

15. A harrow jack including a lifting arm pivotally mounted at one end, and a section connected to the lifting arm and extensible beyond the free end thereof to regulate the height to which the harrow is elevated.

16. A harrow jack including a lifting arm consisting of spaced members and a returned bend connecting the same, one of the members being pivotally mounted and the other member being longitudinally extensible.

In testimony whereof I affix my signature in presence of two witnesses.

ARVID J. OLSON. [L. S.]

Witnesses:
A. T. RETZLOFF,
GILBERT FLATEN.